United States Patent [19]
Hofer et al.

[11] Patent Number: 6,164,691
[45] Date of Patent: Dec. 26, 2000

[54] STEERING WHEEL

[75] Inventors: J. Curt Hofer, Novi, Mich.; Thomas V. Reidy, Tampa, Fla.

[73] Assignee: Breed Automotive Technology, Inc., Lakeland, Fla.

[21] Appl. No.: 09/358,812

[22] Filed: Jul. 22, 1999

[51] Int. Cl.[7] .............................. B60R 21/20; B62D 1/04
[52] U.S. Cl. ............................................ 280/731; 74/552
[58] Field of Search ................................. 280/731, 728.3; 74/552

[56] References Cited

U.S. PATENT DOCUMENTS

| | | | |
|---|---|---|---|
| 4,640,150 | 2/1987 | Kobayashi et al. | 74/552 |
| 5,584,501 | 12/1996 | Walters | 280/731 |
| 5,692,769 | 12/1997 | Scharboneau et al. | 280/728.2 |
| 5,727,811 | 3/1998 | Nagata et al. | 280/731 |
| 5,845,929 | 12/1998 | Schlett et al. | 280/728.3 |
| 5,897,132 | 4/1999 | Papandreou | 280/728.2 |
| 6,017,481 | 1/2000 | Winget | 264/25 |

*Primary Examiner*—Peter C. English
*Attorney, Agent, or Firm*—Lonnie R. Drayer

[57] ABSTRACT

An integral steering wheel is produced from single-shot injection molding of a single thermoplastic elastomer. The thermoplastic foam material can produce desirable characteristics for both the rim and the airbag cover. The rim of the steering wheel has good wear characteristics and a targeted compressibility or "feel" while the airbag cover has the sought-after strength across a large temperature range and exhibits very little compliance. The present invention is very cost effective since the composite steering wheel/airbag cover is produced from one thermoplastic foam material, the scrim or substrate is not required, and the molding cycle time is drastically reduced.

10 Claims, 3 Drawing Sheets

STEERING WHEEL

FIELD OF THE INVENTION

This invention relates to a steering wheel armature coated with a single thermoplastic material.

BACKGROUND OF THE INVENTION

Steering wheels in general comprise a metal armature that is enclosed in an appropriate covering material such as wood, elastomeric substance, or a combination of the two. With the development of technology of attaching the steering wheel with the airbag module juxtaposed to the steering column (i.e. U.S. Pat. Nos. 5,897,132 and 5,692,769), there became an impetus for developing a single material composite steering wheel/airbag cover. The difficulty with this feat is the physical properties required of a material for the airbag are considerably different from those required of a material in the rim of a steering wheel. The obstacle of producing an integral steering wheel (rim, airbag cover, and spokes are molded from same material) has partially been overcome by utilizing reaction injection molded (RIM) polyurethane. This process produces a final surface that has very good wear properties while being compliant to the touch and relatively low in mass. These properties are highly desirable for a steering wheel rim and, in fact many standard (non-integrated) steering wheels are produced using this process. While this process has also been used extensively for airbag covers in the past, the use of RIM urethane is not nearly as desirable for this application due to the tendency of urethane to fragment during airbag deployment. U.S. Pat. No. 5,692,769 teaches that to overcome this drawback a tough, non-fragmenting material such as a substrate or a scrim is added beneath the airbag cover. Thus, it is inherent in this step that a substrate must be produced prior to the final urethane molding phase and must be introduced into the polyurethane molding tool, by some method, prior to introduction of the polyurethane. This step consumes time during the manufacturing process and adds complexity and cost to the molding due to the necessity of adding attachment features to secure the substrate during the RIM process.

The RIM polyurethane process has additional disadvantages: To promote proper filling of the mold cavity many air vents are employed and the tool is closed in such a way that some additional venting occurs at the meeting point of the two halves of the mold. Invariably some polyurethane material fills the vent areas during the molding process with the result that the molded part must later be trimmed to remove the excess material. During the trimming process it is easy to inadvertently damage the final surface of the product rendering it unacceptable for use.

An additional concern with the reaction injection molding process is the duration of the cycle. This cycle is typically two to three times longer in duration than the cycle associated with a standard injection molding process for a similar part.

To overcome the numerous disadvantages stated above it would be desirable to produce the final surface of the integrated steering wheel using an alternate process. The chief alternative used today to produce steering wheels and airbag covers is standard injection molding. Typically, automotive steering wheels are fabricated using thermoplastic polyvinyl chloride (PVC) based resins while airbag covers are fabricated from high-performance engineered resins known generally as thermoplastic elastomers. These two materials, as used in the subject applications, have very different physical properties. PVC is formulated for good wear characteristics and a targeted compressibility or "feel." The thermoplastic elastomers are chosen for chiefly their strength across a large temperature range and exhibit very little compliance. It is generally recognized that improving the compliance characteristics of a thermoplastic produces an adverse effect on strength and vice versa.

SUMMARY OF THE INVENTION

In order to produce an integrated steering wheel in a single-shot injection molding process a thermoplastic material must be found that will satisfy the dissimilar performance requirements of the steering wheel rim and airbag cover portions. In this invention, a single thermoplastic foam material is injected into a steering wheel mold to produce an integral steering wheel; the composite steering wheel/airbag cover has a continuous external surface molded from a single thermoplastic material. The rim portion and the spoke portions act as support structures for the single thermoplastic foam material.

The rim of the steering wheel has good wear characteristics and a targeted compressibility or "feel" while the airbag cover has the sought-after strength across a large temperature range and exhibits very little compressibility. The airbag cover has the necessary tear strength so that a reinforcing member or substrate does not have to be added underneath the airbag cover.

DESCRIPTION OF THE INVENTION

Figure 1:
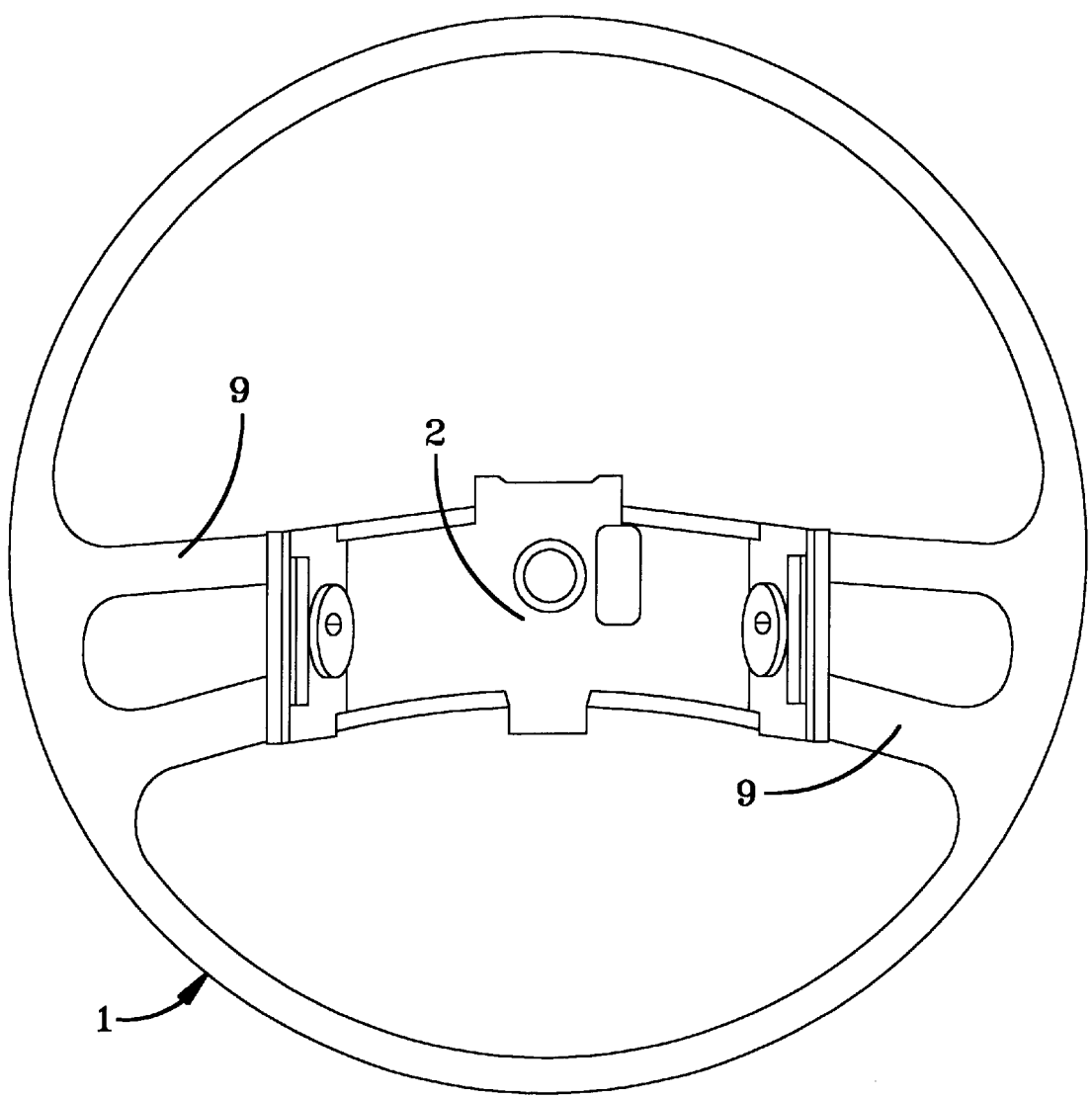
FIG. 1 is a pictorial representation of the metal armature of the steering wheel.

FIG. 1 is a schematic view of a steering wheel armature 1, which is typically made of a suitable metal such as magnesium. The armature has three main components: a rim 8, a hub 2, and spokes 9, which correspond to like numbered components of the finished steering wheel shown in FIG. 2. It is understood that the armature shown in FIG. 1 and the finished steering wheel shown in FIG. 2 are only exemplary of such items and that the structure, appearance, and dimensions may be varied in accordance with good engineering practices without deviating from the scope of the present invention.

Figure 2:
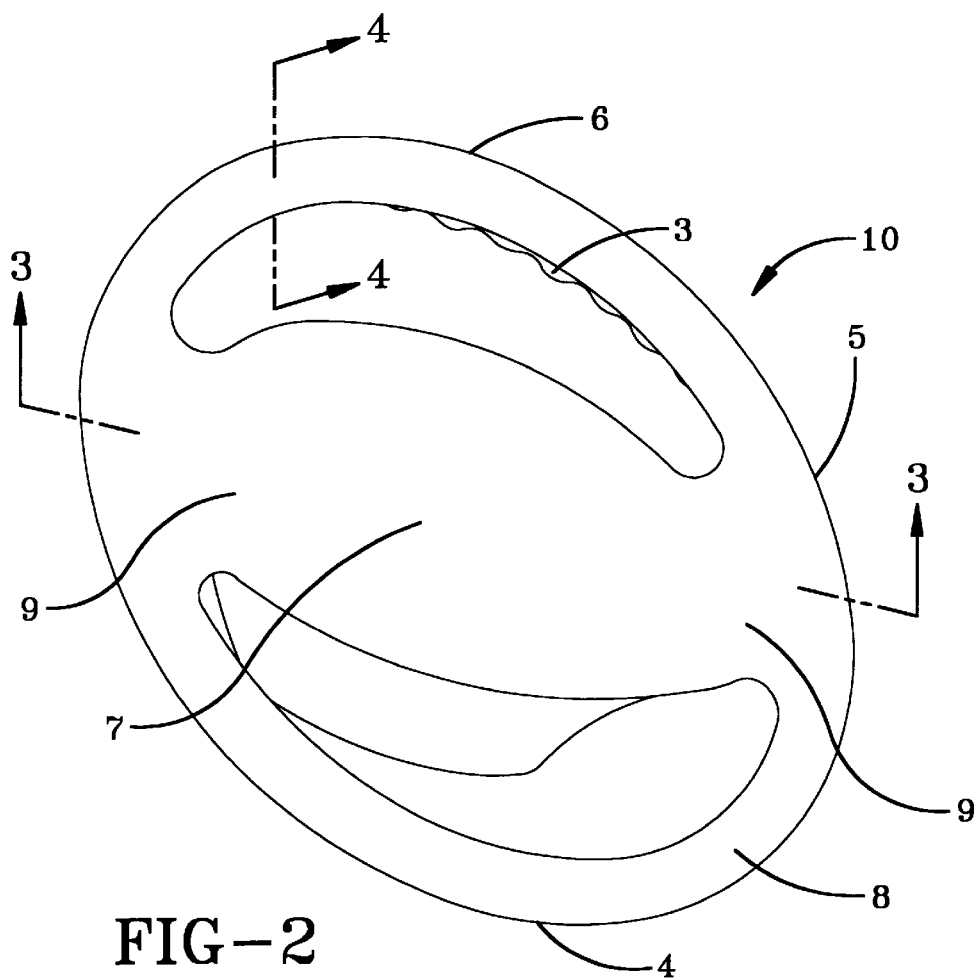
FIG. 2 is a pictorial representation of the steering wheel with the thermoplastic resin coating molded to the armature shown in FIG. 1.
Figure 3:
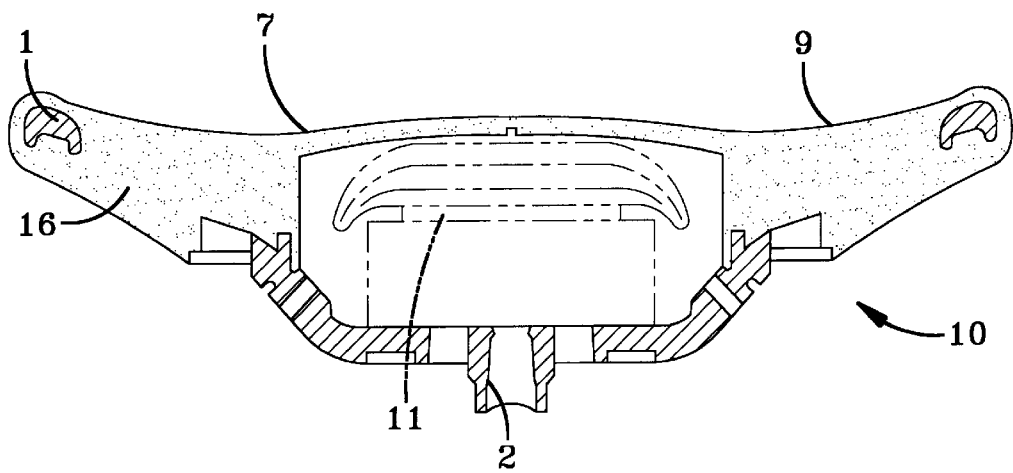
FIG. 3 is a cross section taken along line 3—3 of FIG. 2.

A steering wheel 10 as shown in FIG. 2 has the three main components, each requiring different physical characteristics. The airbag cover 7 aligned with and spaced apart from the hub 2 of the armature, needs to have physical characteristics that will facilitate the proper deployment of an airbag 11 (installed between the hub and the airbag cover), while the steering wheel rim 8 needs to have physical characteristics that demonstrate good wear characteristics and cause the steering wheel to be sufficiently compressible to impart a comfortable feeling to the driver. The spokes 9 are the supporting components of the steering wheel that couple the rim of the steering wheel to the airbag cover and armature hub. The rim portion and the spoke portions are the support structures for the thermoplastic foam material. The composite steering wheel/airbag cover has a continuous external surface molded from a single thermoplastic material. FIG. 3 is a cross section of FIG. 2 taken along 3—3 showing the different components of the steering wheel. The hub 2 is the portion of the steering wheel that connects to the steering column securing the steering wheel to the car. Above the hub is a phantom representation of an airbag module containing both the airbag 11 and the inflator; the airbag cover 7 is depicted above the module. The steering wheel according to this invention is comprised of a single foamed thermoplastic material molded to the armature of the steering wheel.

Thermoplastic materials have compelling advantages over thermoset materials (i.e.polyurethane) such as having greatly reduced molding cycle time, and being able to recycle scrap. Thermoplastic resins significantly reduce manufacturing costs because an auxiliary support member, sometimes referred to as a scrim, is not required for the airbag cover portion of a steering wheel. The prior art does not identify a single thermoplastic material that will yield the necessary physical characteristics for both the rim portion of a steering wheel and the portion of the steering wheel that will function as an airbag cover.

A number of thermoplastic materials were evaluated for possible use in molding a composite steering wheel/airbag-cover. A series of tests were performed on specimens of several different thermoplastic resins (no foaming agent was added) in an attempt to discover a resin that can provide the required physical properties in molding a steering wheel. Resins such as Santoprene 101-65 (obtained from Advanced Elastomer Systems), DYM 7038 (obtained from Dupont Engineering Polymers), and PL 280 (obtained from DSM Engineering Plastics) were eliminated as candidates for molding a composite steering wheel/airbag cover for various reasons. Santoprene 101-65 produced unsatisfactory results in the instrumented impact testing, which looked at the maximum load of the airbag cover. DYM 7038 did not yield desirable molding characteristics, and PL 280 did not produce consistent results on a number of tests. Specimens of Arnitel EM 400 yielded the best overall results in the following described tests: instrumented impact testing, deployment tests at 25° C., 85° C., and −40° C., and various molding tests. Arnitel EM 400 was obtained from DSM Engineering Plastics located at 26877 Northwestern Highway, Suite 410, Southfield, Mich. USA 48034 (The corporate headquarters is in the Netherlands). The exact details of its chemical composition are not known; however, it is known that EM 400 is a flexible thermoplastic elastomer (an elastomer is flexible if a monomer has a large alkyl group). Table 1 provides some data on Arnitel EM 400 polyesterelastomer from published DSM sales literature.

TABLE 1

| Categorical property | Specific property | Property value |
| --- | --- | --- |
| Physical | Hardness Shore D | 38 |
| Mechanical | Izod notched impact strength (23° C.) | No break |
| Thermal | Vicat softening point (10 N at 120° C.) | 140 |

Table 1 provides important values for the properties of EM 400. Arnitel EM 400 had the necessary prerequisite physical, mechanical, and thermal properties to substantiate further research. The next step in evaluating this thermoplastic material was to study its properties in the foam state. The addition of a foaming agent to the copolymer changes the inherent properties of the resin. The foaming agent reduces the specific gravity or the density of the polymer because of the presence of voids or pores embedded in the resin. A foam steering wheel has an improved softness and uses less resin than a steering wheel made from a non-foam resin. The identification of the foaming agent is not known because DSM (manufacturing company of DSM Arnitel 400) has a proprietary right to the chemical.

Figure 4:
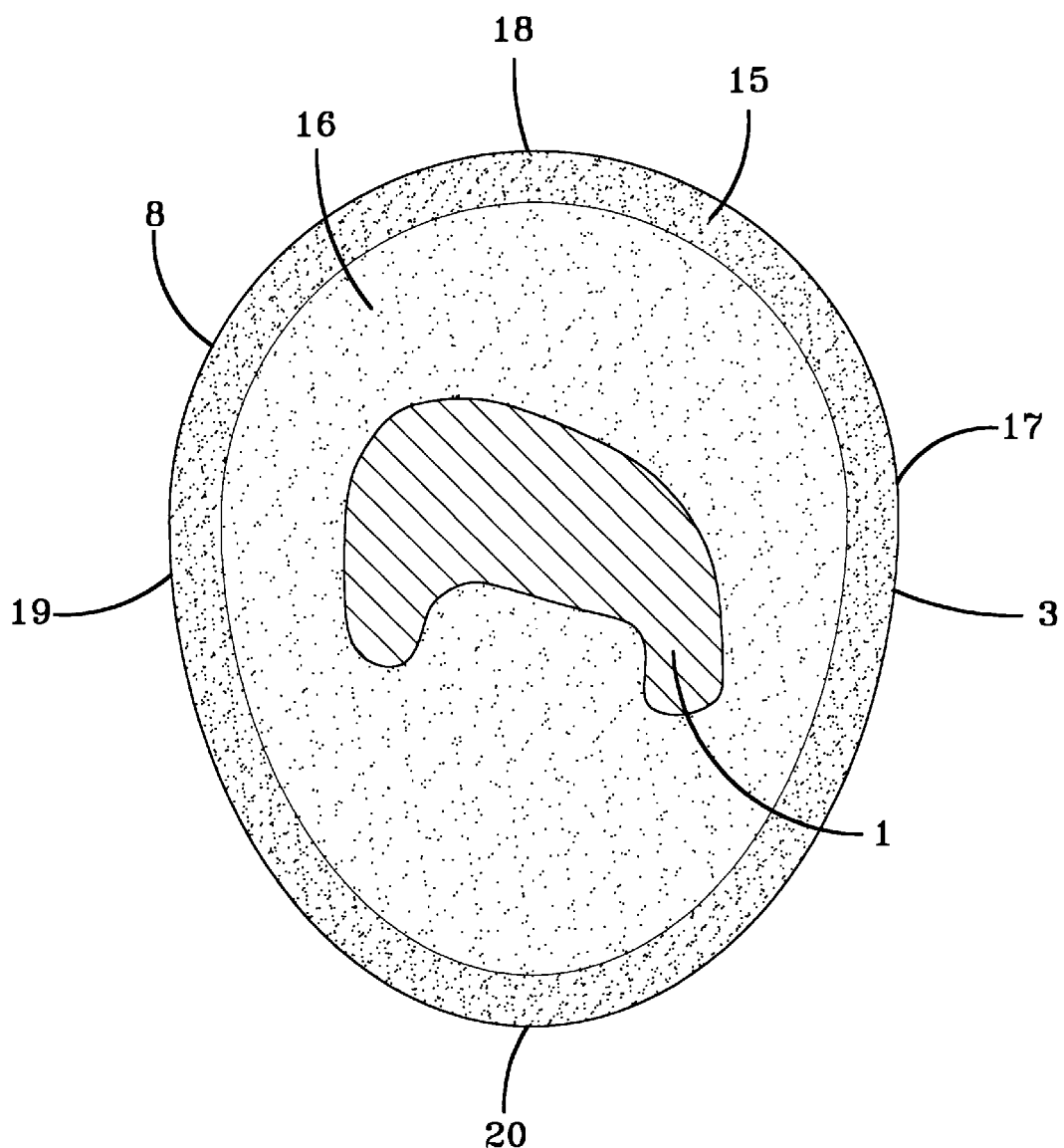
FIG. 4 is an enlarged cross section of the steering wheel rim taken along line 4—4 of FIG. 2.

The thermoplastic resin without the foaming agent has a homogenous cell structure; however the addition of the foaming agent results in the formation of two layers which can be viewed in FIG. 4: the external skin 15 and the underlying core 16. The skin layer has a greater density than the underlying core.

EXPERIMENT 1: ASCERTAINING TEAR STRENGTH, HARDNESS, AND PERCENT DENSITY REDUCTION

Plaques of EM 400 were studied to gather preliminary information concerning the foamed product. A myriad of tests was performed on ⅛ inch thick and ¼ inch thick plaques of non-foam and foamed Arnitel EM 400. The different thickness plaques have remarkably different physical characteristics because a thinner section plaque can cool more quickly and thus does not allow the thermoplastic material the chance to expand. The ⅛" plaque is not thick enough to allow for sufficient expansion and thus a definitive core layer is not present. The ¼" plaque is thick enough to allow for expansion and thus two distinct layers are formed: the external skin and the underlying core. These two different thickness plaques were chosen because they simulate the rim and the airbag cover of the integral steering wheel. The ⅛ inch plaques serve as a model for the airbag cover while the thicker ¼ inch plaques serve as a model for the rim portion of the steering wheel.

Tear tests were performed on the plaques at three different temperatures to ensure sufficient strength of the foamed resin at extreme temperatures. The samples were subjected to tear testing per ASTM D624 using an Instron 5568 universal testing machine. Table 2 provides the tear strength at three different temperatures for foam EM 400 and for the non-foam resin.

TABLE 2

| Plaque thickness | 85° C. (lbf/in) | Ambient | −40° C. (lbf/in) |
| --- | --- | --- | --- |
| EM 400 ¼" (foam) | 145 ± 10.6 | 272 ± 12.6 | 1176 ± 59.7 |
| EM 400 ¼" (non-foam) | 392 ± 2.9 | 506 ± 5.9 | 748 ± 54.1 |
| EM 400 ⅛" (foam) | 349 ± 0.45 | 444 ± 11.8 | 806 ± 89.3 |
| EM 400 ⅛" (non-foam) | 349 ± 0.5 | 451 ± 4.8 | 769 ± 35.5 |

It has been determined that the tear strength for an airbag cover portion of a steering wheel at 85° C. needs to be above 100 pounds per linear inch and greater than 150 pounds per linear inch at room temperature. According to these established requirements, the tear strengths obtained for the plaques had sufficient magnitude to be satisfactory for use in producing a composite steering wheel/airbag cover.

For the second test, a hardness test, the samples were subjected to Durometer Shore A hardness testing per ASTM D2240. The hardness test was employed in an attempt to quantify the "feel" or compressibility of the thermoplastic material. Table 3 provides the hardness values for foam and non-foam EM 400.

TABLE 3

| Plaque thickness | Average Shore A Hardness |
| --- | --- |
| EM 400 ¼" (foam) | 91.9 ± 0.20 |
| EM 400 ¼" (non-foam) | 91.0 ± 0.89 |
| EM 400 ⅛" (foam) | 92.8 ± 1.03 |
| EM 400 ⅛" (non-foam) | 93.1 ± 0.58 |

For the Shore A hardness test, the associated hardness of the substance increases as the measured value increases. The foam ¼" thickness plaques should have a smaller measured value for the hardness than the non-foam ¼" thickness plaques because the expansion of the thermoplastic material should result in a "softer" more compressible material. However, the measured values were similar due to the limitations of the Shore A hardness test. This method of hardness determination has inherent limitations due to the fact that the caliper only measures the hardness of the surface of the plaque without taking into account the overall hardness of the plaque (the surface along with the underlying core). A subjective test of manually touching or compressing the plaques was performed to find out if the desired "hardness" was achieved. The foam ⅛" plaques were determined to be a little too hard, and thus minor variations of EM 400 are being evaluated to uncover a derivative of EM 400, which is slightly softer.

The density of the foam provides great insight about its physical properties. If the density reduction (the difference in density of the non-foam EM 400 and the foam EM 400) is small, then the final product does not have the desirable softness and there is negligible reduction in resin quantity. On the other hand, if the density reduction is great, then there will be a large amount of voids and this will result in the final product being deformable. Table 4 provides the average percent density reduction from fifteen ¼" plaques and fifteen ⅛" plaques.

TABLE 4

| Plaque thickness | Average initial weight (g) | Foamed Weight (g) | Percent reduction | Specific gravity |
| --- | --- | --- | --- | --- |
| EM 400 ¼" | 76.60 | 55.8 | 27.21 | 0.83 |
| EM 400 ⅛" | 40.35 | 38.72 | 4.04 | 1.09 |

The change in density is very trivial for the ⅛" plaque, which is favorable because the airbag cover needs to have a high tear strength. On the other hand, the ¼" plaques demonstrated a significant percent reduction (27.21), which is desirable because the rim portion of the steering wheel needs to be soft to the touch.

EXPERIMENT 2: PAINT STUDIES

The ⅛" and ¼" foamed plaques were sent to Sherwin Williams, a paint company, to make certain that the foamed resin plaques could be easily painted. Testing performed at Sherwin Williams showed that plaques of both thicknesses were paintable without adhesion promoter. Both samples of EM400 passed initial adhesion and adhesion after 96 hour water immersion. While this is not considered exhaustive testing for adhesion, it is a very good indicator that the material is paintable without adhesion promoter, which reduces the costs of manufacturing.

EXPERIMENT 3: PHYSICAL PROPERTIES OF THE STEERING WHEEL RIM

The invention is a one component system; the foamed Arnitel EM 400 is molded to form the rim 8, the spokes 9, and the airbag cover 7 portions of the steering wheel 10. The process for molding the steering wheel is a single shot injection technique. Molding parameters can be modified to alter the skin thickness and overall density. These include mold temperature, injection time, and shot size among others. For the molding of most steering wheels the optimal mold temperature range is from 120° F. to 190° F., and the optimal injection rate is from two to four seconds per cavity. The shot size, the volume of material to fill the mold, will vary depending on the size of the steering wheel.

The different portions of the steering wheel have different density reductions. The airbag cover has a density reduction of between 5–20% while the rim and spokes have a density reduction of up to 40%. The smaller density reduction for the airbag cover contributes to the cover having the desirable strength to withstand fragmentation during deployment.

Utilizing the molding parameters discussed previously, two prototype steering wheels were molded and then subjected to skin and foam cell examination. One steering wheel was injected with 4% (by weight) foaming agent while the other steering wheel was injected with 2% (by weight) foaming agent. The thermoplastic resin obtained for this experiment was in the concentrate form with the foaming agent preblended with the resin. The Arnitel EM 400 was injected by means of a single gate into the steering wheel mold. In Table 5, the first column contains information indicating the percentage of foaming agent added to the thermoplastic resin. Also the first column contains information concerning the location samples were removed from the steering wheel. At three discrete locations on the rim of the steering wheel, a section was removed. FIG. 2 shows the three locations: bottom 4, middle 5 and top 6. On each section of the steering wheel, four samples were examined which can easily be seen from FIG. 4: grip 17 (undulation 3 for finger positioning), 90° from grip 18, 180° from grip 19, and 270° grip 20. The sections are circular and hence the degrees indicate the distance around the circle that the samples were removed. In columns three through five of Table 5, values are presented of the skin thickness as well as the foam thickness. For labeling purposes of the completely symmetrical steering wheel, the area of the steering wheel where the thermoplastic foam material is injected is designated as the bottom of the steering wheel. The third column contains data from samples located on the opposite end of the injection gate. The fourth column contains data from a point halfway around the rim of the steering wheel while the fifth column contains data from the area where the foam was injected.

TABLE 5

| (col 1) Sample ID | (column 2) Location around Wheel > Location around the Rim ↓ | (column 3) Top Thickness (mm) Skin | (column 3) Top Thickness (mm) Foam | (column 4) Middle Thickness (mm) Skin | (column 4) Middle Thickness (mm) Foam | (column 5) Bottom Thickness (mm) Skin | (column 5) Bottom Thickness (mm) Foam |
|---|---|---|---|---|---|---|---|
| 2% | Grip - FIG. 4 #20 | No clear delineation between the skin/foam was noted | | 1.7 | 5.5 | 0.63 | 6.4 |
| 2% | 90° CW from grip FIG. 4 - #19 | Same as above | | 1.3 | 1.1 | 0.68 | 6.1 |
| 2% | 180° CW from grip FIG. 4 - #18 | Same as above | | 1.5 | 3.6 | .92 | 7.7 |
| 2% | 270° CW from grip FIG. 4 - #17 | Same as above | | 1.6 | 3.6 | .85 | 2.6 |
| 4% | Grip FIG. 4 - #20 | Same as above | | 2.1 | 5.9 | 1.5 | 5.7 |
| 4% | 90° CW from grip FIG. 4 - #19 | Same as above | | 1.9 | 0.6 | .95 | 6.0 |
| 4% | 180° CW from grip FIG. 4 - #18 | Same as above | | 1.3 | 3.6 | .95 | 7.6 |
| 4% | 270° CW from grip FIG. 4 - #17 | Same as above | | 1.8 | 3.3 | .73 | 3.0 |

The results from Table 5 were obtained by using a Mitutoyo Digimatic vernier caliper. Due to the general lack of clear delineation between the skin and foam, the findings are visual approximations. The skin measurements were representative of the outer skin only. The data reveals that regardless of the location of the sample on a section on the top portion of the steering wheel, there is no clear skin layer present. The bottom (at gate) region exhibited smaller voids more concentrated near the inner skin area. The level of voids at the middle area of sample 2% was minimal, with more voids noted in the same area in sample 4%. The top region of the steering wheel (end of fill) exhibited large voids within the cross section (ascertained by using Javelin camera with a Vivitar macrozoom lens system), some as large as the total cross section. Thus utilizing a one gate system for injecting the foamed EM 400 yielded unsatisfactory results and in order to produce a tolerable number of voids, more than one gate needs to be used.

While the forms of the apparatus and method herein described constitute preferred embodiments of the invention, it is to be understood that this invention is not limited to these precise forms of apparatus and that changes may be made therein without departing from the true spirit and scope of the invention which is defined in the appended claims.

We claim:

1. A steering wheel comprising an armature having a hub portion connected to a rim portion by a spoke portion; the rim portion and spoke portion of the armature each acting as a direct support structure for a single thermoplastic foam material which has a continuous external surface around the rim portion and spoke portion and forms an airbag cover which is aligned with and spaced apart from the hub portion of the armature, the portion of the thermoplastic foam material supported by the rim portion has different physical properties than the portion of the thermoplastic foam material forming the air bag cover.

2. The steering wheel of claim 1, wherein the airbag cover is free of any reinforcing member.

3. The steering wheel of claim 1 wherein the portion of the thermoplastic foam material supported by the rim portion of the armature has an external skin that is solid and a foam portion that is interposed between the skin and the armature.

4. The steering wheel of claim 1 wherein the portion of the thermoplastic foam material forming the airbag cover is substantially solid.

5. The steering wheel of claim 1 wherein the portion of the thermoplastic foam material supported by the rim portion has a greater thickness than the portion of the thermoplastic foam material forming the airbag cover; the portion of the thermoplastic foam material supported by the rim portion has a pronounced delineation between an external skin layer and an underlying core thereof, said underlying core has a lower density than the external skin layer; the airbag cover comprises predominantly a skin layer.

6. The steering wheel of claim 1 wherein the thermoplastic foam material is molded.

7. The steering wheel of claim 1 wherein the thermoplastic foam material is formed of a foaming agent added to a flexible thermoplastic elastomer.

8. The steering wheel of claim 7 wherein the thermoplastic foam material for the airbag cover has a 5–20% lower density than the flexible thermoplastic elastomer.

9. The steering wheel of claim 7 wherein the thermoplastic foam material for the rim has up to a 40% lower density than the flexible thermoplastic elastomer.

10. The steering wheel of claim 1 wherein the tear strength of the airbag cover is greater than 100 pounds per linear inch at 85° C. while greater than 150 pounds per linear inch at ambient temperature.

* * * * *